United States Patent
Sammarco (10) Patent No.: US 8,199,734 B2
(45) Date of Patent: Jun. 12, 2012

(54) METHOD AND APPARATUS FOR SHARING COMMON INTEREST LINKS BETWEEN COMMUNICATION DEVICES

(75) Inventor: Anthony J. Sammarco, Raleigh, NC (US)

(73) Assignee: Sony Mobil Communications AB, Lund (SE)

(*) Notice: Subject to any disclaimer, the term of this patent is extended or adjusted under 35 U.S.C. 154(b) by 737 days.

(21) Appl. No.: 11/955,467

(22) Filed: Dec. 13, 2007

(65) Prior Publication Data
US 2008/0285527 A1    Nov. 20, 2008

Related U.S. Application Data

(60) Provisional application No. 60/938,154, filed on May 15, 2007.

(51) Int. Cl.
*H04W 4/00* (2009.01)
*G06F 15/16* (2006.01)

(52) U.S. Cl. .................................. 370/338; 709/227

(58) Field of Classification Search ................ 370/338; 709/227
See application file for complete search history.

(56) References Cited

U.S. PATENT DOCUMENTS

| | | | |
|---|---|---|---|
| 6,549,768 B1 * | 4/2003 | Fraccaroli | 455/456.3 |
| 6,922,721 B1 | 7/2005 | Minborg et al. | |
| 6,977,909 B2 | 12/2005 | Minborg | |
| 6,996,072 B1 | 2/2006 | Minborg | |
| 7,418,268 B1 * | 8/2008 | Cabano et al. | 455/518 |
| 7,877,082 B2 * | 1/2011 | Eagle et al. | 455/414.1 |
| 2002/0065883 A1 | 5/2002 | Lunsford et al. | |
| 2002/0087632 A1 | 7/2002 | Keskar | |
| 2005/0271041 A1 | 12/2005 | Minborg | |
| 2006/0114845 A1 | 6/2006 | Minborg | |
| 2006/0234631 A1 | 10/2006 | Dieguez | |
| 2006/0271569 A1 * | 11/2006 | Fong et al. | 707/100 |

(Continued)

FOREIGN PATENT DOCUMENTS

CN     1397141 A    2/2003

(Continued)

OTHER PUBLICATIONS

International Search Report mailed Mar. 13, 2009 in connection with International Application No. PCT/US2008/063601 filed May 14, 2008.

*Primary Examiner* — Kenny Lin
(74) *Attorney, Agent, or Firm* — Coats & Bennett, P.L.L.C.

(57) ABSTRACT

Techniques for processing data related to common interests of two or more users of a communication system are disclosed. In an exemplary method disclosed herein, the occurrence of a trigger event at a first communication device is detected, wherein the trigger event is related to communications between the first communication device and a second communication device. In response to the trigger event, the transmission of a first data object to the second communication device is initiated, wherein the first data object comprises information indicating one or more interests of a user of the first communication device. The exemplary method further comprises receiving and processing a second data object formed in response to the first data object, the second data comprising data related to one or more common interests shared by the users of the first and second communication devices. Similar methods suitable for implementing at a user communication device or at a data object server are disclosed, as are correspondingly configured devices.

19 Claims, 7 Drawing Sheets

U.S. PATENT DOCUMENTS

2007/0258553 A1 * 11/2007 Bloebaum et al. ............ 375/358

FOREIGN PATENT DOCUMENTS

| EP | 1249143 B1 | 1/2001 |
|---|---|---|
| GB | 2375921 A | 11/2002 |
| JP | 11184890 A | 7/1999 |
| JP | 2001014330 A | 1/2001 |
| JP | 2001-067400 A | 3/2001 |
| JP | 2001-075972 A | 3/2001 |
| JP | 2004-070710 A | 3/2004 |
| JP | 2004-355070 A | 12/2004 |
| WO | 0022860 A | 4/2000 |

* cited by examiner

METHOD AND APPARATUS FOR SHARING COMMON INTEREST LINKS BETWEEN COMMUNICATION DEVICES

RELATED APPLICATIONS

The present application claims priority under 35 U.S.C. Section 119(e) to provisional application Ser. No. 60/938,154, filed May 15, 2007, the contents of which are incorporated by reference herein.

BACKGROUND

The present invention relates generally to communication systems. More specifically, the invention relates to the transfer of data objects to communication devices in a communication system.

With the convergence of voice and data communication networks, portable communication devices are increasingly likely to support several communication modes, as well as a number of communication-related applications. Single-purpose cellular phones and alphanumeric pagers have given way to complex mobile devices supporting voice communications, e-mail, and instant messaging. A typical device often includes a camera, a music player, and sound recorder, and may include a global positioning system (GPS) receiver. Many of these devices and their supporting wireless networks now enable simultaneous use of multiple communication modes. Thus, a device user today might engage in a voice call and simultaneously send or receive text messages, digital images, video clips, or the like.

A few applications have been developed to take advantage of this simultaneous availability of multiple communications modes. In particular, several patents and patent application publications describe a so-called Phone Pages system, in which the generation and transfer of multimedia data objects is triggered by various communication-related events. These data objects, or Phone Pages, thus supplement a primary communication session, such as a voice call, an e-mail exchange, or an instant message conversation. The Phone Pages concept is described in the following patents and patent application publications, the contents of which are each incorporated by reference herein: U.S. Pat. No. 6,922,721, titled "Exchange of Information in a Communication System" and issued on Jul. 26, 2005 to Minborg et al.; U.S. Patent Application Publication 2005/0271041 A1, titled "Exchange of Information in a Communication System" and filed on Jun. 1, 2005 by Minborg et al.; U.S. Pat. No. 6,996,072, titled "Method and Apparatus for Exchange of Information in a Communication Network" and issued on Feb. 7, 2006 to Minborg; U.S. Pat. No. 6,977,909, titled "System and Method for Exchange of Information in a Communication Network" and issued on Dec. 20, 2005 to Minborg; and U.S. Patent Application Publication 2006/0114845, also titled "System and Method for Exchange of Information in a Communication network" and filed on Nov. 14, 2005 by Minborg.

The communication techniques and systems described in the preceding references provide a variety of enhancements to conventional modes of communication, facilitating the convenient exchange of various data objects between users of communications devices. These enhancements may be quite valuable both for promoting personal relationships and for supporting business and enterprise communications. However, if unrestrained, the increased flow of data objects may be overwhelming, both for system users and for the system itself. In particular, users may be concerned about whether received data is relevant to their activities and interests.

SUMMARY

Methods and apparatus are disclosed for processing data of common interest to two or more parties engaged in a communication session. The inventive techniques disclosed herein thus aid in controlling the relevancy of data exchanged between users of a communication system. In an exemplary method, the occurrence of a trigger event at a first communication device is detected; the trigger event may be related to communications between the first communication device and a second communication device. In response to the trigger event, the transmission of a first data object to the second communication device is initiated, wherein the first data object comprises information indicating one or more interests of a user of the first communication device. The exemplary method further comprises receiving and processing a second data object formed in response to the first data object, the second data comprising data related to one or more common interests of the user of the first communication device and the user of the second communication device.

In another embodiment of the invention, a first data object, such as might be formed by the first communication device above, is received, the first data object again including first information indicating one or more interests of a user of the first communication device. In response, a second data object is assembled, using the first information as well as second information indicating one or more interests of a user of a second communication device, wherein the second data object comprises data relating to one or more common interests shared by the users of the first and second communication devices. The method further comprises sending the second data object to at least the first communication device.

In some embodiments, the methods described herein may be implemented at a mobile terminal; in others, the methods may be implemented at a data object server; in still others the methods may be implemented at either. Embodiments of a communication device configured to process data related to common interests shared by communication device users are also disclosed, as are embodiments of a data object server in accordance with several aspects of the invention. Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention is described below in reference to a wireless telecommunications system providing voice and data services to a mobile device. Various systems providing voice and data services have been deployed, such as GSM networks (providing circuit-switched communications) and GPRS (providing packet-switched communications); still others are currently under development. These systems may employ any or several of a number of wireless access technologies, such as Time Division Multiple Access (TDMA), Code Division Multiple Access (CDMA), Frequency Division Multiple Access (FDA), Orthogonal Frequency Division Multiple Access (OFDMA), Time Division Duplex (TDD), and Frequency Division Duplex (FDD). The present invention is not limited to any specific type of wireless communications network or access technology. Indeed, those skilled in the art will appreciate that the network configurations discussed herein are only illustrative. The inventive techniques disclosed herein may be applied to "wired" devices accessing conventional voice or data networks, as well as wireless devices. The invention may be practiced with devices accessing voice and/or data networks via wireless local area networks (WLANs) or via one or more of the emerging wide-area wireless data networks, such as those under development by the 3rd-Generation Partnership Project (3GPP).

Figure 1:
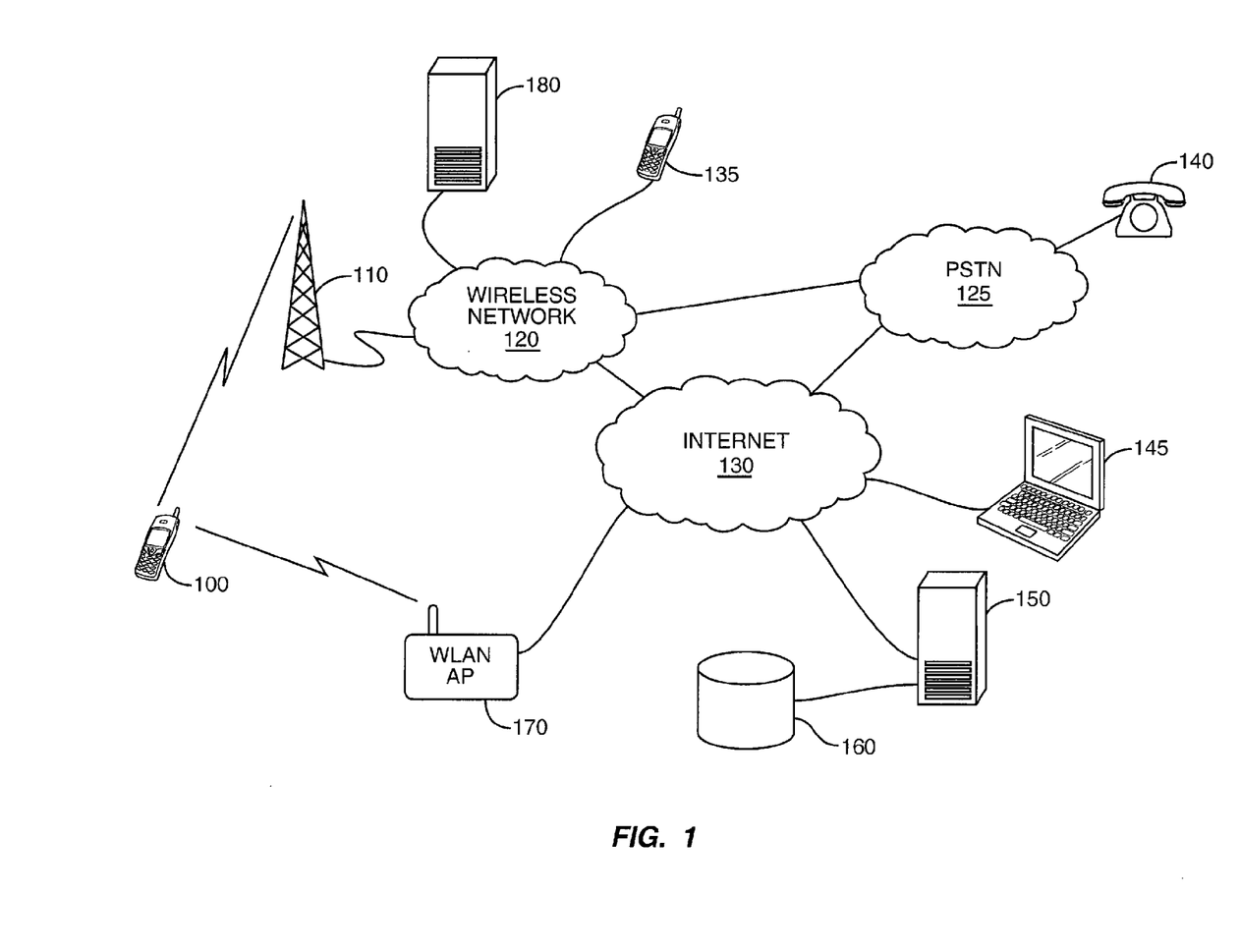
FIG. 1 illustrates a communication system according to one or more embodiments of the present invention.

FIG. 1 illustrates an exemplary communications system in which the present invention may be employed. Communications device 100 communicates with other devices through base station 110, which is connected to wireless network 120. Wireless network 120 is in turn connected to the Public Switched Telephone Network (PSTN) 125 and the Internet 130. Wireless device 100 can thus communicate with various other devices, such as wireless device 135, conventional landline telephone 140, or personal computer 145. In FIG. 1, wireless device 100 also has access to data server 150 via the Internet 130; data server 150 may be configured to provide access through Internet 130 to data or applications stored in storage device 160. Storage device 160 may comprise one or more of a variety of data storage devices, such as disk drives connected to data server 150 or one or more other servers, a Redundant Array of Inexpensive Drives (RAID) system, or the like.

Communications device 100 may be a cordless telephone, cellular telephone, personal digital assistant (PDA), communicator, computer device, or the like, and may be compatible with any of a variety of communications standards, such as the Global System for Mobile Communications (GSM) or one or more of the standards promulgated by 3GPP. Communications device 100 may include a digital camera, for still and video images, as well as a digital sound recorder and digital music player application. Communications device 100 may also support various applications in addition to voice communications, such as e-mail, text messaging, picture messaging, instant messaging, video conferencing, web browsing, and the like.

Communications device 100 also includes a wireless local-area network (WLAN) transceiver configured for communication with WLAN access point 170. WLAN access point 170 is also connected to Internet 130, providing communications device 100 with alternative connectivity to Internet-based resources such as data server 150.

Also connected to wireless network 120 is location server 180. Location server 180 is typically maintained by the operator of wireless network 120, but may be separately administered. The main function of location server 180 is to determine the geographic location of mobile terminals (such as mobile terminal 100) using the wireless network 120. Location information obtained by location server 180 may range from information identifying the cell currently serving mobile terminal 100 to more precise location information obtained using Global Positioning System (GPS) technology.

Other technologies, including triangulation methods exploiting signals transmitted from or received at several base stations, may also be used to obtain location information. Triangulation techniques may include Time Difference of Arrival (TDOA) technology, which utilizes measurements of a mobile's uplink signal at several base stations, or Enhanced-Observed Time Difference (E-OTD) technology, which utilizes measurements taken at the mobile terminal 100 of signals sent from several base stations. GPS-based technologies may include Assisted-GPS, which utilizes information about the current status of the GPS satellites derived independently of the mobile terminal 100 to aid in the determination of the terminal's location.

Figure 2:
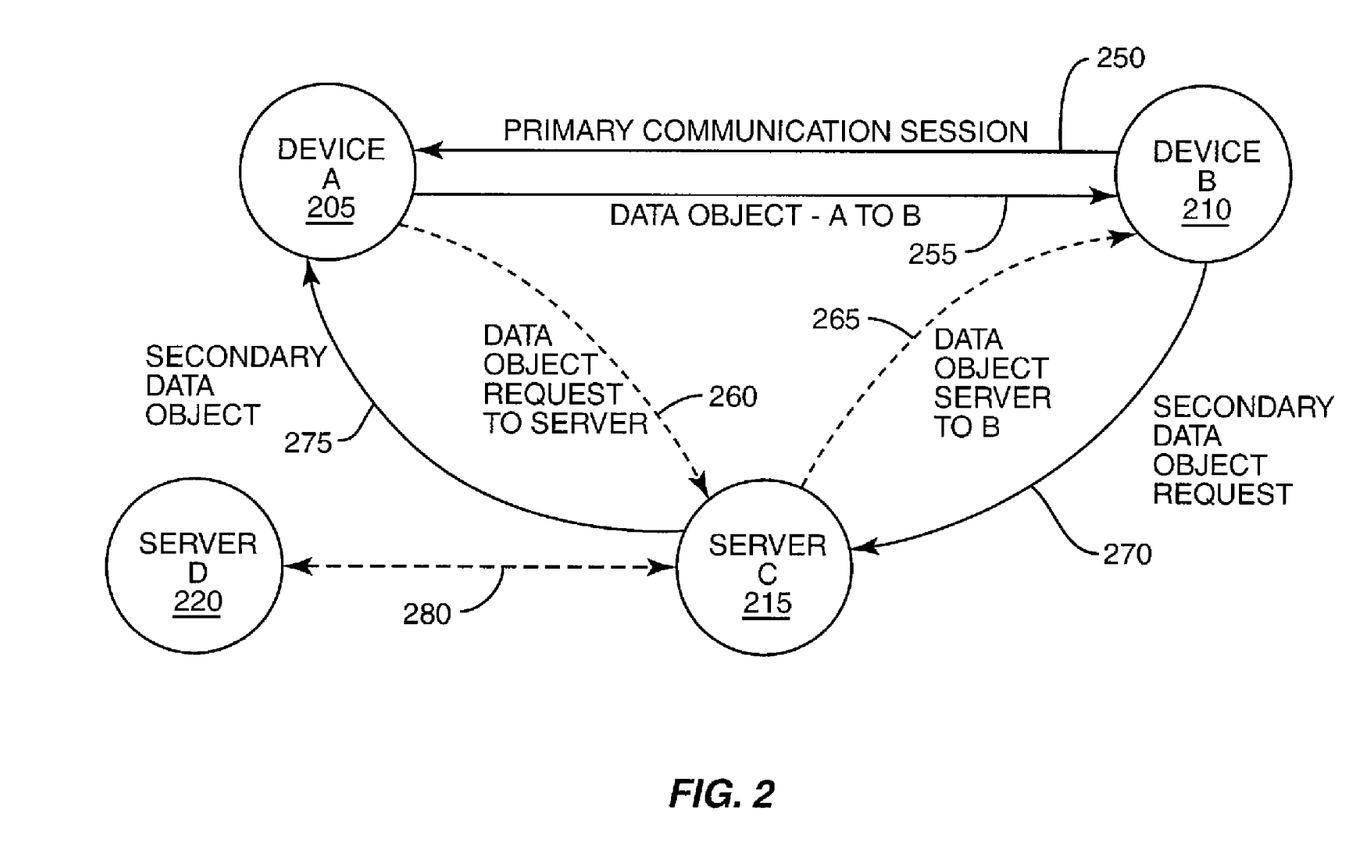
FIG. 2 illustrates an exemplary system for transferring data objects between communication devices in a communications system.

FIG. 2 presents a simplified view of a system 200 for exchanging data of common interest to two or more users of a communication system. System 200 includes a first communication device A 205, a second communication device B 210, a data object server C 215, and an external server D 220. In some embodiments, communication devices A 205 and B 210 may comprise any of the end user devices described herein, such as, for example, communication device 100 of FIG. 1, and data object server 215 may comprise any of the servers described herein, such as server 150 or server 180 of FIG. 1.

In some embodiments, the various systems and methods described herein may enable the users of communication devices A 205 and B 210 to—upon the occurrence of a trigger event, for example—transmit and receive data objects between them. These data objects may comprise digital audio, digital images, video clips, text, or the like. In some embodiments, the data objects may be specifically related to various events occurring during a communication session between devices A 205 and B 210, such as the Phone Pages described in the earlier-referenced patents and patent applications. These triggering events may include, for example, the initial establishment of a voice call or other communication session, or a change in communication status, such as a caller being placed on hold, or the arrival or departure of another party to a multi-party communication session. Other trigger events might include, but are not limited to:

An outgoing call is or is about to be initiated.
A called party answers a call.
A called party is busy.
A called party does not answer after a pre-determined time or number of rings.
A called party rejects a call.
A called party is unavailable (e.g., an addressed mobile phone is out of coverage).
An incoming call is imminent or has just started.
A conference call is or is about to be initiated.
A call is disconnected.
A call is conducted (under which several triggering events can be generated).
A party is placed on hold.
The location of a party has changed.
A communication device is switched on or off.
A special-function button is pressed on a communication device.
A button or other user interface device is activated in response to a query.
A voice mail, text message, e-mail, instant message, or the like is received.

A voice mail, text message, e-mail, instant message, or the like is received.

While many of the preceding trigger events are related to traditional voice communications, those skilled in the art will appreciate that many analogous trigger events will apply to other communication modes, such as instant messaging, e-mail, video conferencing, "chat" sessions, and so on.

In some embodiments, the data objects may comprise data or information that may be of mutual interest to the users of communication devices A 205 and B 210, such as interests in music, style, restaurants, school or professional affiliations, or the like. In some cases, particular data objects may only be relevant in the event that one or more particular trigger events have occurred. In any case, the data objects, or the constituent data to be used in forming data objects, may be stored within a communication device or within a remote server, database or other storage device.

As shown in FIG. 2, the users of communication devices A 205 and B 210 are engaged in a primary communication session 250. Primary communication session 250 may comprise a voice call (e.g., circuit or VoIP), instant message (IM) session, or any other modes of communication such as those described herein or combinations thereof. In some embodiments, communication device A 205 and communication device B 210 may each include a module or application that is able to determine the user's areas of interest through various interfaces with the user, whether verbally, autonomously (e.g., based on prior transactions or activities conducted by the user), or with the assistance another entity attached to the communication network, such as, for example, a location server, a database (e.g., the Phone Pages database). In some embodiments, such areas of interest may be communicated to others via data objects containing indications reflecting each user's areas of interest, such as, for example, the user's favorite music style, restaurants, or other particular category of interest.

In some embodiments, during the primary communication session 250 with communication device B 210, a triggering event may occur at communication device A 205. Such trigger may occur, for example, upon the occurrence of any of the following events or combinations thereof:

Completing establishment of the session with user B;

A file download by one or both users (the resulting data object may include interest information related to the download contents);

Accessing by one device of a profile page or database associated with a user of the other device;

Being in a specific location that user A has associated with particular private or personal data. ("While in New Orleans I like Jazz music, while in Seattle I like grunge music," etc.);

User A manually activates a button or other user interface device (explicit request);

"Sharing" or other transfer of a file between the devices (the resulting data object may include interest information related to the file contents and/or type);

Any other trigger events, such as those described above or in U.S. Pat. No. 6,996,072.

In some embodiments, upon detection of a trigger event, an application in communication device A 205 may directly send—or transmit a request to data object server C 215 for it to send—a data object to communication device B 2410 containing data or information related to the interests of the user of communication device A 205. A direct transfer of a data object to device B 210 is shown in FIG. 2 as data object transfer 255. An alternative procedure includes sending a data object request to server C 215, as shown in FIG. 2 at 260, resulting in a data object transfer 265 from the server C 215 to device B 210. In some embodiments, the request to data object server C 215 may include the identity of communication device B 210 and data or information related to the interests of the user of communication device A 205. In some embodiments, common interest groups may also be established in a similar manner. That is, data or information indicating that all users are interested in a particular style of music or other category of interest may be sent and received as provided herein among three or more users.

In some embodiments, upon receiving the primary data object indicating interests of the user of communication device A 205, communication device B 210 may take the information from the primary data object related to user A's interests and combine it with information related to user B's own interests. Communication device B 210 may then send a request to data object server C 215, as shown at 270, requesting that it provide a secondary data object to communication device A 205. In some embodiments, the requested secondary data object may comprise data or information related to the common interests shared by the users of communication devices A 205 and B 210, such as, for example, a picture of user A's favorite musical group along with a Universal Resource Locator (URL) for downloading the group's latest song. In some embodiments, the type of secondary data object may also be included in the request, i.e., specified by the request from communication device B 210. In some embodiments, the requested secondary data object may comprise a picture with a link, and optionally graphical or textual information related to the common interests.

Upon receipt of the request, data object server C 215 may create a data object and transfer it to communication device B 210, as shown at 275. As noted above, in some embodiments the data object may comprise data and information related to the interests of the users of communication device A 205 and communication device B 210, or any other data or information that may be transmitted via phone pages or data objects. In some embodiments, if data object server C 215 does not have the capability to construct the requested secondary data object by itself, it may request additional information from another source such as server D 220, via communication link 280. In the above embodiment, for instance, data object server C 215 could request a link to the music group's latest song downloads. Server D 220 may then either return the requested information or return a link to where the object can be retrieved. When the secondary data object is constructed, data object server C 215 may send or transmit it to communication device A 205 and/or communication device B 210. The above process can be repeated in an iterative manner.

In short, the various systems and methods disclosed herein enable the sharing of "common interest" IP links (URLs), pictures, and data, for example, between two or more users of communications devices, when those users are engaged in a primary communication with each other. In general, the process is initiated by the sending of a data object directly from A to B, followed by the sending of additional data objects, requested by B, from server C to both B and A. The process can proceed iteratively from there as A and B share new related data objects of mutual interest. For instance, A might send a data object showing interest in a particular musical band. B may then respond with a data object, via server C, including a sample of a link to a newly released live version of a popular hit song by the musical band. This data object, requested by B, is delivered both to A and B. A may respond requesting and/or delivering another data object, with yet another sample or link related to the musical band, or to a similar music group.

Figure 3:
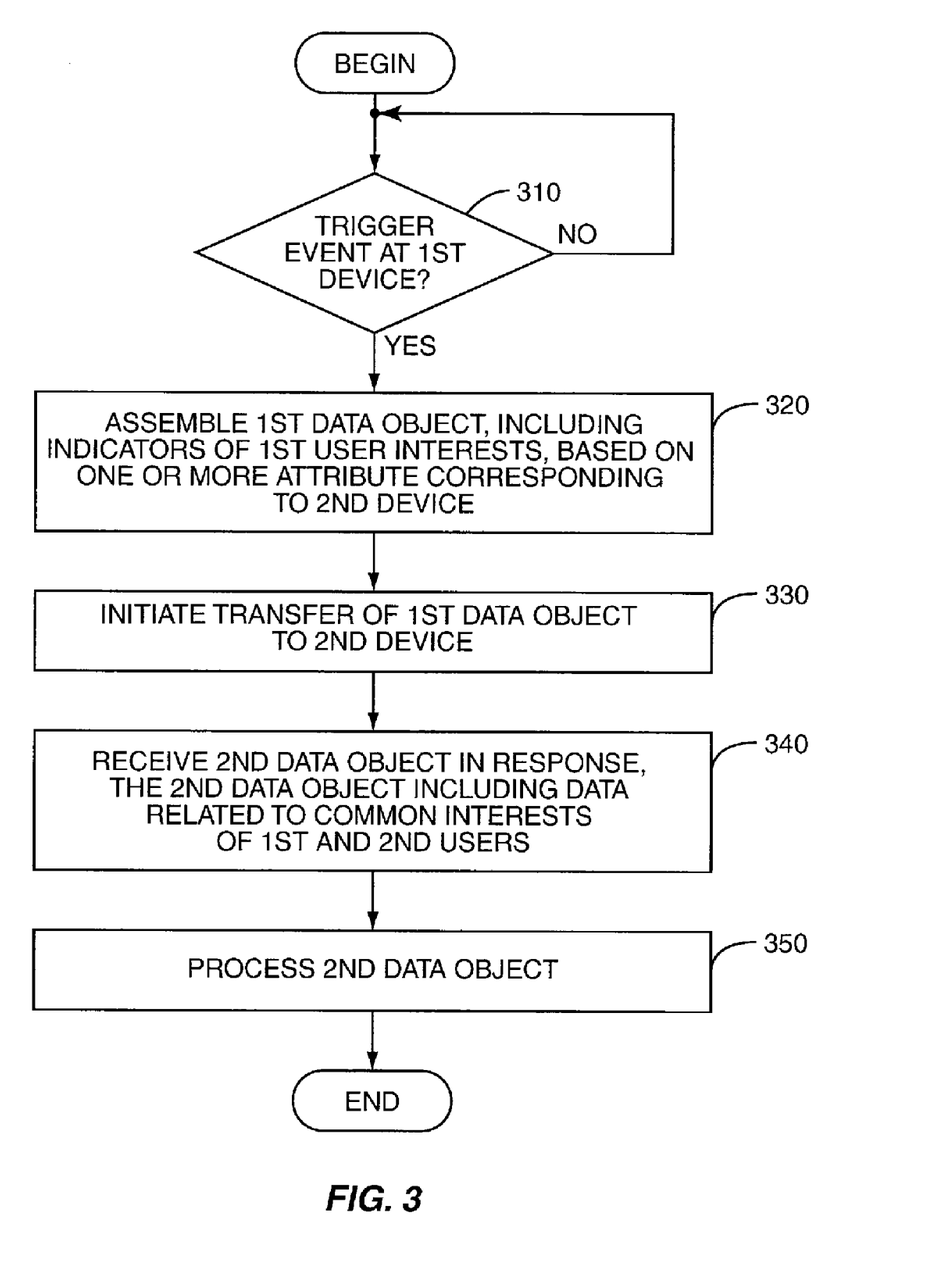
FIG. 3 is a logic flow diagram according to one or more embodiments of the present invention.

FIG. 3 thus illustrates an embodiment of a method for sharing data of common interest among users of a communication system. The method of FIG. 3 may be implemented, for example, at a first communication device operated by a first user of the communication system, such as at device A 205 of FIG. 2, in communication with a second device and second user, e.g., device B 210 of FIG. 2.

The method of FIG. 3 begins with the monitoring for a trigger event at the first communication device, as shown at block 310. As explained above, this trigger event may be any of a wide variety of events related to the communication session or transaction between the first communication device and the second communication device. In some cases, the trigger event might be the activation of a button or menu selection by the user of the first communication device, such activation or selection indicating that the first user wishes to share interests information.

Upon the detection of a trigger event at block 310, a data object is assembled in response, as shown at block 320. The data object includes information indicating one or more interests of the first user, such as music genres or artists, restaurants and/or types of food, school, professional, or athletic affiliations, and so on. These interests may be encoded according to some standard, or may simply comprise keywords, such as "Pop", "Beatles", "Washington Redskins", or the like.

The data object may also be based on one or more attributes corresponding to the second communication device. These attributes might include, by way of non-limiting example, a communications address for the second communication device (which might, for instance, allow the inference of certain device capabilities), a device capability for the second communication device, a communication type for the communication between the first and second communication devices, and a preference profile for the user of the second communication device. For example, if it is known to the first device that the second device is capable of rendering video (this might be inferred from the type of primary communication, or from previous transactions), certain keywords or parameters might be added or withheld from the data object based on the attribute. Similarly, the interests information for the first user might also be "filtered" with respect to attributes of the first communications device. For example, if the first user's device is capable of playing back MP3 music files, but not Advanced Audio Codec (AAC) music files, the interests information may reflect that.

At block 330, the transfer of the first data object to the second communication device is initiated. In the case where the assembly of the first data object is performed at the first communication device, the first communication device sends the data object to the second communication device, using any applicable communications mechanisms, such as e-mail, instant message, SMS, and so on. In other embodiments, the steps of blocks 320 and 330 may be reversed, so that the first communication device initiates the transfer of a first data object by requesting an external server to transmit the data object. In this case, the external data object server may assemble the first data object, based on pre-determined interests information for the first user.

As discussed above, the interests information included in the first data object may be combined with interests information for the second user to determine common interest information. This common interests information may in turn be used to retrieve data of interest to both parties. Thus, at block 340, the first user receives a second data object in response to the first data object, the second data object including data related to common interests shared by the first and second users. This second data object may have been sent by the second communication device, or by a data object server on behalf of the second user. Finally, at block 350, the second data object is processed by the first communications device. This processing may include displaying any text, images, or video included in the second data object (any of which may be encoded and/or compressed according to conventional means) or retrieving data using pointers, such as URLs, included in the second data object.

Figure 4:
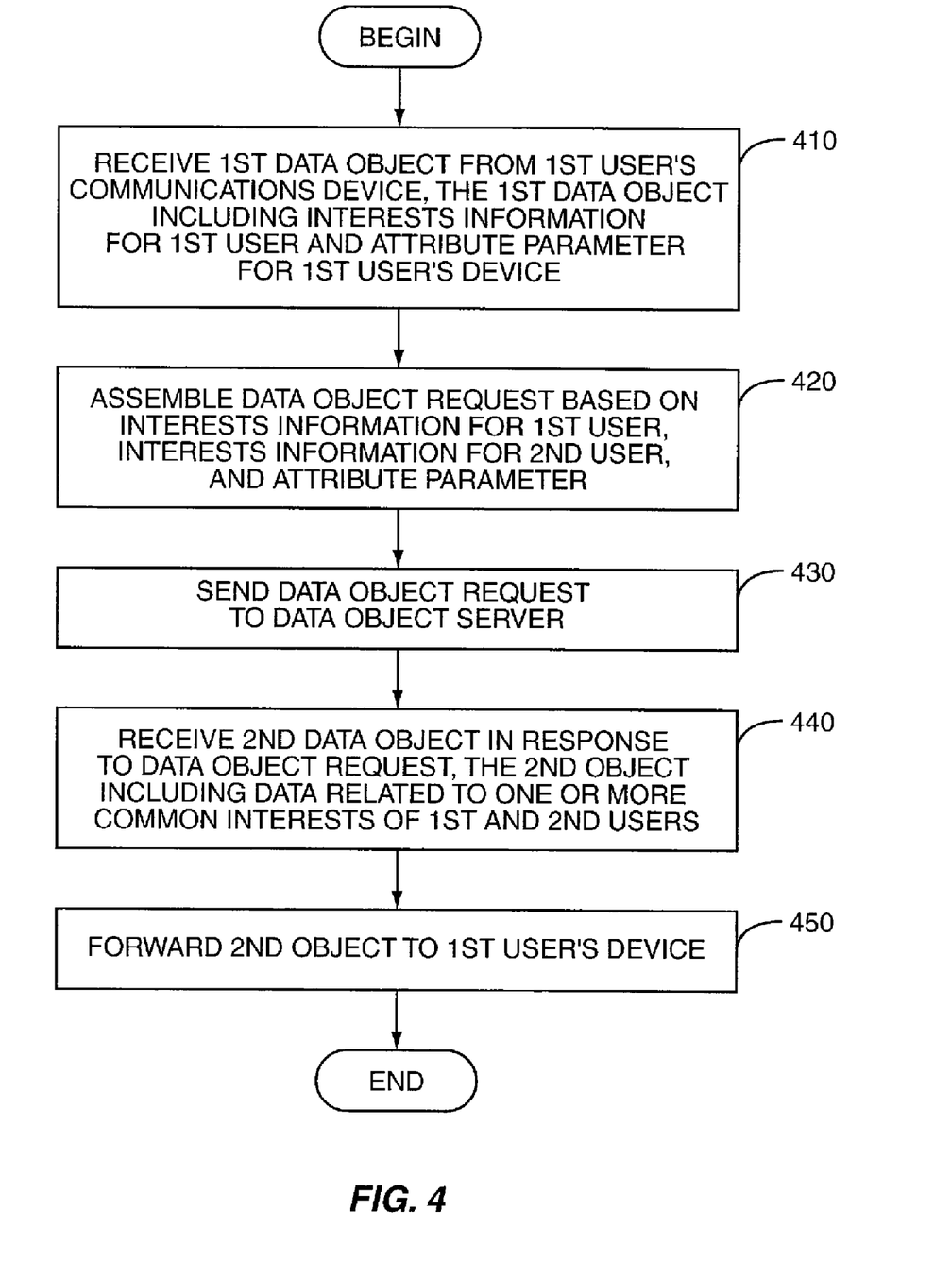
FIG. 4 is a logic flow diagram according to another embodiment of the present invention.

Another method for processing data of common interest to users of a communication system is shown in FIG. 4. The method of FIG. 4 corresponds in some respects to that illustrated in FIG. 3, and is perhaps best understood in the context of implementation at the second communication device, e.g., device B 210 in FIG. 2.

The method of FIG. 4 begins with the reception of a first data object including interests information for a user of a remote device, as shown at block 410. Thus, if the method of FIG. 4 is implemented at device B 210 of FIG. 2, then the interests information included in the first data object corresponds to the user of device A 205. Those skilled in the art will appreciate that the first data object may have originated at the remote device, or may have been sent on behalf of the remote device, such as by server C 215 in FIG. 2.

In addition to the interests information, the first data object may also include attribute information corresponding to the remote device. This attribute information may indicate, for instance, one or more device capabilities or restrictions for the remote device, such as the ability or inability to decode or render certain types of files. This attribute information may be used, along with the interests information for the remote user and interests information for the local user (e.g., the user of device B 210), to produce a data object request for one or more data objects of common interest to the two users, as shown at block 420.

Typically, assembling the data object request comprises comparing the interests information received from the remote user with interests information stored locally for the local user. For instance, keywords included in the first data object may be compared with a local interests profile for the local user. In some embodiments, keywords or other parameters of the first data object may be compared to titles and/or metadata for some or all of the files stored locally at the device. For example, the first data object may include the keyword "Beatles"; this keyword may in some embodiments be compared to metadata for files included in local device storage. A match indicates a common interest; several matches might indicate a stronger common interest than a single match.

Various filters and/or prediction algorithms might also be used in conjunction with parameter and/or keyword matching. For instance, keyword matching might generate a large number of matches. These matches might be filtered or weighted according to frequency, relation to other interests, by how recent the matched data was created or accessed, and so on. Likewise, prediction algorithms might exploit apparent relationships between individual data items or types. For example, several different matches in a particular group, such as matches between two music groups in a particular genre, may generate a prediction that a third group in that genre may also be a common interest of the two parties.

Once common interests are identified and/or predicted, a data object request, comprising one or more parameters or keywords indicating those common interests, is sent to a data object server, as pictured at block 430. The data object request may include one or more parameters indicating any of the attributes discussed above for the first or second user equipment, for use by the data object server in selecting appropriate data. In some embodiments, the data object request may include additional parameters identifying one or more types of data objects, e.g., audio, video, images, text, that are preferred or required. The data object server, which may have access to more powerful prediction algorithms and which will typically have access to substantially more data than either of the user devices, may use the data object request to identify and select one or more items of common interest to the users. Thus, a second data object containing one or more of these data items and/or URLs pointing to these items is then sent to the requesting device.

At block 440, this second data object is received by the requesting device. The requesting device may then forward the second data object to the remote device. Alternatively, the data object request sent to the data object server may include a communications address for the remote device so that the data object server may send the second data object to both devices at the same time.

Figure 5:
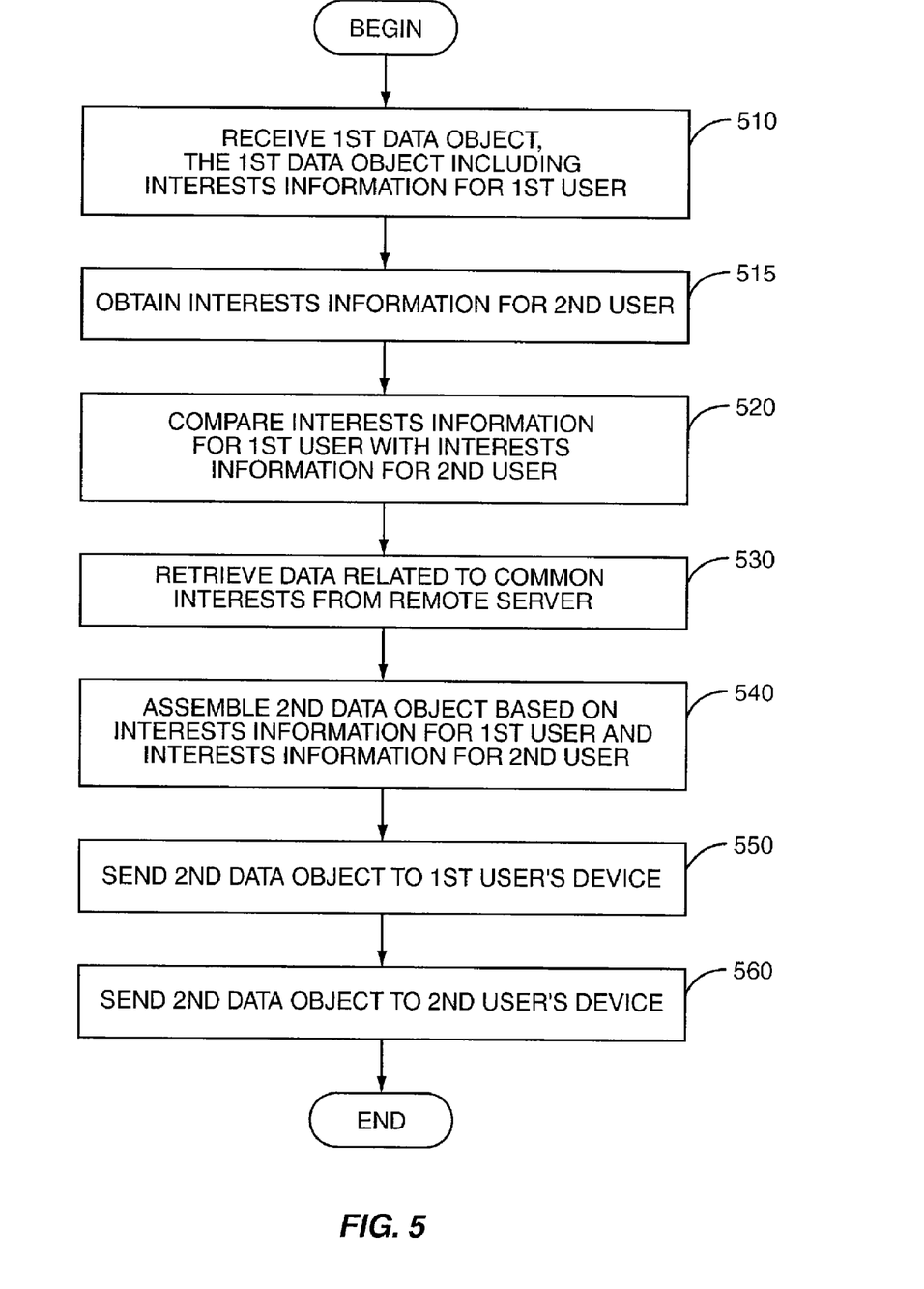
FIG. 5 is another logic flow diagram illustrating another embodiment of the invention.

Another embodiment of the present invention is illustrated in FIG. 5. The pictured method may be implemented at a data object server, such as server C 215 in FIG. 2, and is described below in that context. However, those skilled in the art will appreciate that the method as illustrated, with the last step omitted, may also be implemented at a user communication device, such as device B 210 in FIG. 2.

At block 510, a first data object is received, containing at least interests information for a first user participating in a communication session. This first data object may be received from the first user device, or may received from the second user device, perhaps after the second user device has supplemented the first user interests information with additional information. At block 515, interests information for the user of the second device is obtained. In some embodiments, this second interests information is stored locally, perhaps in the form of an interests profile for the second user. In other embodiments, a user interests profile may be retrieved from a remote location, using an identifier for the second user. In some embodiments, the second user interests information is also included in the first data object. In yet other embodiments, all or part of the user interests information for the second user is extracted from other data (e.g., file names, metadata, etc.) associated with the second user.

At block 520, the first user interests information from the first data object is compared to the second interests information for a second user participating in the communication session. The comparison of the interests information for the two users may comprise keyword matching or more complex processing, as discussed above in reference to FIG. 4.

The comparison process of block 520 generates common interest information. At block 530, this common interest information is used to retrieve data related to the users' common interests from a remote server. In embodiments where the method of FIG. 5 is implemented at a server, such as server C 215 of FIG. 2, all or part of the data of common interest to the users may be retrieved from one or more remote servers, such as server D 220. In embodiments where the method of FIG. 5 is implemented at a user device, such as device B 210 of FIG. 2, the data of common interest may be retrieved from a first server, such as server C 215, or from remote servers such as server D 220, perhaps using server C 215 as an intermediary.

In any event, one or more data items of common interest to the users is included in a second data object, as shown at block 540. At block 550, the second data object is sent to the first user's device. Those skilled in the art will appreciate that this may be done by the assembling server or by a requesting end user device. At block 560, the second data object is sent to the second user device. Thus, both user devices have access to data items of common interest. Those skilled in the art will appreciate that the methods illustrated herein may easily be extended to communication groups of more than two participants.

Figure 6:
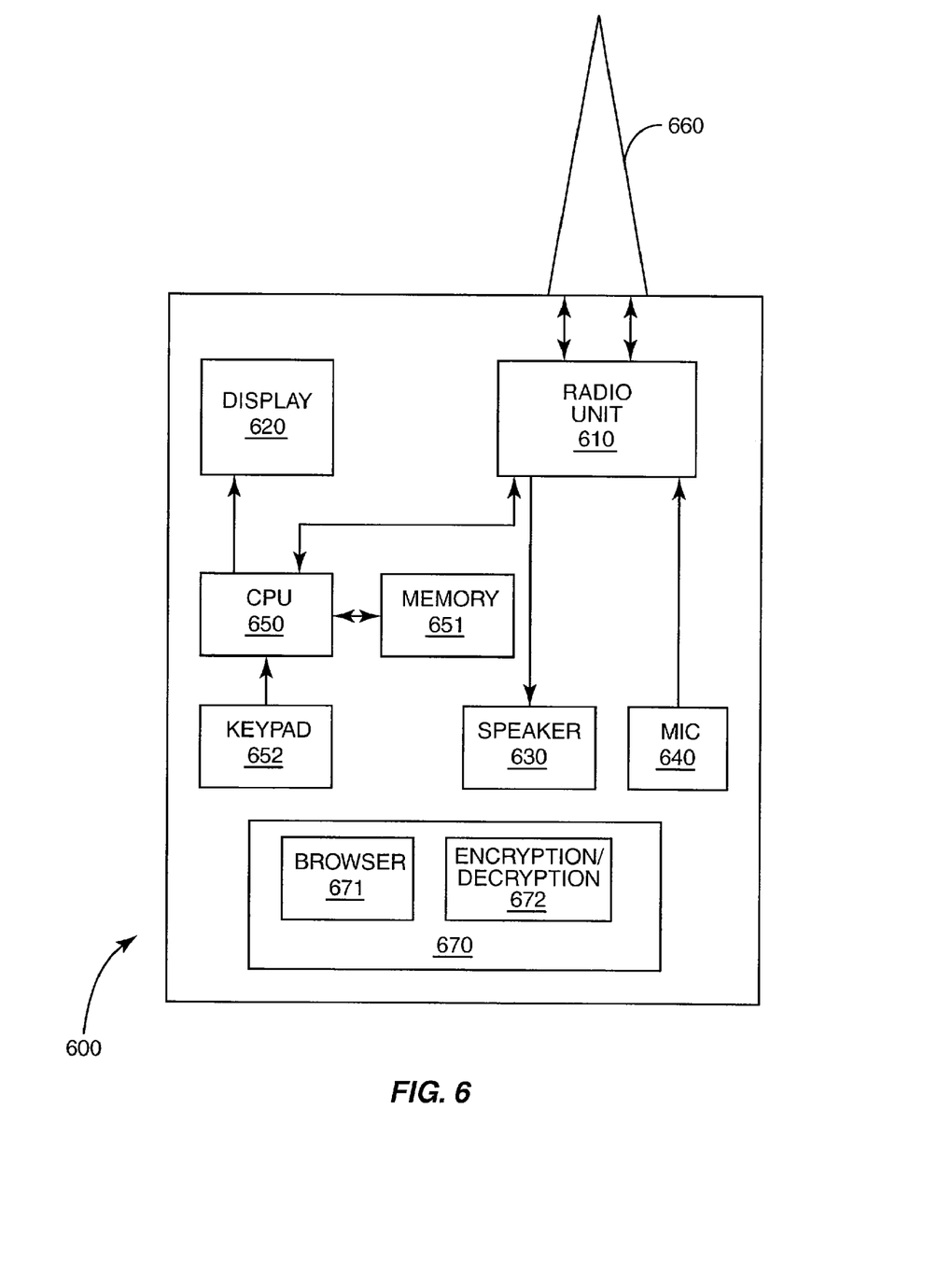
FIG. 6 is a block diagram illustrating an exemplary communication device.

FIG. 6 illustrates an exemplary communication device 600 to be used in several embodiments of the present invention. In the pictured embodiment, communication device 600 may comprise a mobile telephone, or a personal digital assistance (PDA) device with mobile telephone capabilities. Communication device 600 includes a central processing unit (CPU) 650, connected to at least one memory unit 651, and at least one display 620. The CPU 650 may also be connected to a keyboard device or area 652 to allow subscribers to enter, for example, digits or alphanumeric characters. The memory unit 651 may include non-volatile memory (e.g., flash, EEPROM or SIM card) in order to retain stored information, should power be temporarily unavailable.

The CPU 650 is further connected to a radio unit 610 configured to convert incoming and outgoing data to and from radio frequency (RF) modulated signals. The radio unit 610 also connects to an antenna 660 for transmission and reception of the RF signals. Radio unit 610 may also directly or indirectly be connected to an earphone 630 and a microphone 640 in order to allow voice communication. Communication device 600 may further comprise a plurality of programs 670, such as a browser 671, that can render at least one type of data object, and an encryption/decryption engine 672, allowing data object requests to be encrypted and data objects to be decrypted. Communication device 600 may optionally be equipped with a cache memory in which it is possible to store and retrieve data objects without occupying transmission resources within the communication network.

In some embodiments of the present invention, CPU 650 and/or other processing logic included in communication device 600 is configured to carry out one or more of the methods described above. In one embodiment in particular, communication device 600 may comprise processing logic configured to detect the occurrence of a trigger event, the trigger event related to communication between device 600 and a second communication device. In response to the trigger event, the processing logic is configured to initiate the transmission of a first data object to the second communication, the first data object comprising information indicating one or more interests of a user of the first communications device. The communication device 600 may in some embodiments generate and send the first data object itself; in others, device 600 may request that the first data object be sent by a data object server. As described above, the first data object may be used by the remote device or a data object server to assemble a second data object containing one or more data items relating to the common interests of the first and second device users. Thus, device 600 is further configured to receive this second data object, and to process it, such as by displaying one or more of the data items included in the second data object, or by retrieving one or more data items using a URL included in the second data object.

In other embodiments, the processing logic of device 600 may be configured to receive a first data object indicating one or more interests of a remote device user. In these embodiments, device 600 is configured to assemble a request for a second data object, using first interests information included in the first data object and interests information for the user of device 600. Device 600 is configured to send the resulting second data object request to a data object server, where it may be used to produce a second data object comprising data related to one or more common interests shared by the first and second device users. Device 600 is thus further configured to receive this second data object in response to the data object request. In some embodiments, device 600 is also configured to forward the second data object to the remote communication device.

Figure 7:
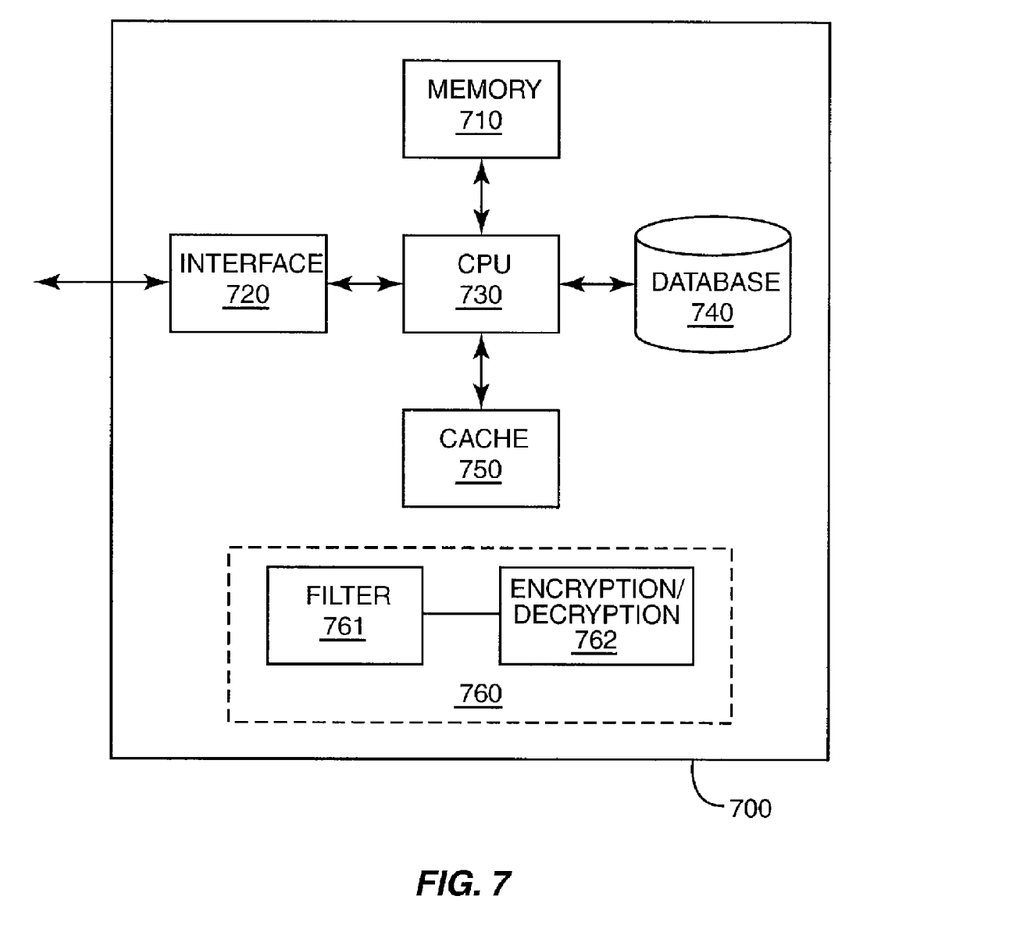
FIG. 7 is a block diagram illustrating an exemplary data object server.

FIG. 7 illustrates a data object server 700 according to one or more embodiments of the present invention. Data object server 700 comprises at least one CPU 730 connected to at least one memory device 710, a cache memory 750, at least one database 740 and at least one network interface 720. Memory devices 710 and databases 740 may include non-volatile memory, such as flash, magnetic, or optical storage devices. Network interface 720 enables the CPU 730 to send and receive data to/from the data network 130. The cache memory 750 allows storage of frequently used data objects so that the CPU 730 may obtain them readily. The database 740 contains the actual data objects that can be requested by a communication device, such as communication device 400, via, for example, the wireless network 120 and Internet 130 pictured in FIG. 1. The data object server may further comprise a number of programs 760 including, but not limited to, a filter 761, allowing the data objects to be optimized according to the rendering capabilities of the communication device 400, and an encryption/decryption engine 762, allowing data object requests to be decrypted and data objects to be encrypted.

In some embodiments of the present invention, the data object server 700 is configured to carry out one or more of the methods described above. In particular, data object server 700 may comprise processing logic (e.g., CPU 730, configured with appropriate software) configured to receive a first data object comprising first information indicating one or more interests of a user of a first communication device. The data object server 700 may then use the first information, along with second information indicating one or more interests of a user of a second communication device, to assemble a second data object comprising data related to one or more common interests of the users of the first and second communication devices. The data object server 700 is further configured to send the second data object to the first communication device, or the second communication device, or both.

Those skilled in the art will appreciate that the various functions of communication device 600 and data object server 700 may be performed using various combinations of hardware and software. Accordingly, each of the described processing blocks may in some embodiments directly correspond to one or more commercially available or custom microprocessors, microcontrollers, or digital signal processors. In other embodiments, however, two or more of the processing blocks or functional elements of device 600 or data object server 700 may be implemented on a single processor, while functions of other blocks are split between two or more processors. Likewise, memories 651 and 710 are representative of the one or more memory devices containing the software, firmware, and data used to implement base station functionality in accordance with one or more embodiments of the present invention. Thus, these memory devices may include, but are not limited to, the following types of devices: cache, ROM, PROM, EPROM, EEPROM, flash, SRAM, and DRAM.

Those skilled in the art should appreciate that the present invention broadly provides methods and apparatus for processing data of common interest to two or more users of a communication system. The present invention may, of course, be carried out in other specific ways than those herein set forth without departing from the scope and essential characteristics of the invention. Thus, the present invention is not limited to the features and advantages detailed in the foregoing description, nor is it limited by the accompanying drawings. Indeed, the present invention is limited only by the following claims, and their legal equivalents.

What is claimed is:

1. A method for processing data of common interest to users of a communication network, comprising:
    detecting the occurrence of a trigger event related to a pre-existing primary communication session between a first communication device and a remote second communication device, wherein the first communication device and the remote second communication device transmit and receive communication data between each other via the pre-existing primary communication session, and wherein the trigger event related to the pre-existing primary communication session reflects a status change of the pre-existing primary communication session;
    responsive to the occurrence of the trigger event, initiating the transmission of a first data object to the second communication device, via the communication network, wherein the first data object comprises information indicating one or more interests of a user of the first communication device;
    receiving a second data object formed in response to the first data object, wherein the second data object comprises data related to one or more common interests shared by users of the first and second communication devices; and
    processing the second data object.

2. The method of claim 1, wherein initiating the transmission of a first data object to the second communication device comprises requesting that a data object server send the first data object to the second communication device.

3. The method of claim 1, wherein initiating the transmission of a first data object to the second communication device comprises sending the first data object to the second communication device.

4. The method of claim 3, further comprising assembling the first data object based on at least one attribute corresponding to the second communication device before initiating the transmission of the first data object to the second communication device.

5. The method of claim 4, wherein the at least one attribute comprises one or more of a communication address for the second communication device, a device capability for the second communication device, a communication type for the communication between the first and second communication devices, and a preference profile for the second communication device.

6. The method of claim 1 wherein the trigger event comprises the establishment of a communication session or call between the first and second communication devices, the establishment of a secondary communication session between the first and second communication devices, a timer-based periodic or random event, or a manual activation by a user of the first communication device.

7. A method, in a data object server, for providing data of common interest to users of first and second communication devices in a communication network, comprising:
    receiving a first data object from either the first communication device or the second communication device, wherein the first data object comprises first information indicating one or more interests of the user of the first communication device and second information indicating one or more interests of the user of the second communication device;

assembling a second data object from the first information and the second information, wherein the second data object comprises data related to one or more common interests shared by the users of the first and second communication devices; and sending the second data object to the first communication device via the communication network.

8. The method of claim 7, further comprising retrieving all or a portion of the data related to the one or more common interests from a second server.

9. The method of claim 7, wherein the first data object further comprises at least one attribute parameter corresponding to the first communication device, and wherein assembling the second data object from the first information and from second information comprises adapting the second data object based on the at least one attribute parameter.

10. The method of claim 9, wherein the at least one attribute parameter comprises one or more of a communications address for the first communication device, a device capability for the first communication device, a communication type for the communication between the first and second communication devices, and preference data for the first communication device.

11. A method for providing data of common interest to users of a communication network, comprising:
receiving, at a second communications device, a first data object, wherein the first data object comprises first information indicating one or more interests of a user of a first communication device;
assembling a data object request from the first information and from second information indicating one or more interests of a user of the second communication device;
sending the data object request to a data object server; and
receiving a second data object in response to the data object request, the second data object comprising data related to one or more common interests shared by the users of the first and second communication devices.

12. The method of claim 11, further comprising forwarding the second data object to the first communication device.

13. The method of claim 11, wherein the first data object further comprises at least one attribute parameter corresponding to the first communication device, and wherein assembling the second data object from the first information and from second information comprises adapting the second data object based on the at least one attribute parameter.

14. A first communication device configured for communication over a communication network with a remote second communication device, wherein the first communication device comprises processing logic configured to:
detect the occurrence of a trigger event related to a pre-existing primary communication session between the first communication device and the second communication device, wherein the first communication device and the remote second communication device transmit and receive communication data between each other via the pre-existing primary communication session, and wherein the trigger event related to the pre-existing primary communication session reflects a status change of the pre-existing primary communication session;
initiate transmission of a first data object to the second communication device via the communication network, responsive to the occurrence of the trigger event, wherein the first data object comprises information indicating one or more interests of a user of the first communication device;
receive a second data object formed in response to the first data object, wherein the second data object comprises data related to one or more common interests shared by the users of the first and second communication devices; and
process the second data object.

15. The first communication device of claim 14, wherein the processing logic is configured to initiate transmission of the first data object to the second communication device by requesting that a data object server send the first data object to the second communication device.

16. The first communication device of claim 14, wherein the processing logic is configured to initiate transmission of the first data object to the second communication device by sending the first data object to the second communication device.

17. The first communication device of claim 16, wherein the processing logic is further configured to assemble the first data object based on at least one attribute corresponding to the second communication device.

18. A data object server comprising processing logic configured to:
receive a first data object, from either a first communication device or a second communication device, comprising first information indicating one or more interests of a user of the first communication device and second information indicating one or more interests of a user of the second communication device;
assemble a second data object from the first information and the second information, wherein the second data object comprises data related to one or more common interests shared by the users of the first and second communication devices; and
send the second data object to the first communication device.

19. The data object server of claim 18, wherein the first data object further comprises at least one attribute parameter corresponding to the first communication device, and wherein assembling the second data object from the first information and from second information comprises adapting the second data object based on the at least one attribute parameter.

* * * * *